United States Patent Office 3,226,222
Patented Dec. 28, 1965

3,226,222
HIGH NITROGEN REACTION PRODUCTS OF $NH_3$-$P_2O_5$ AND PROCESS THEREFOR
Charles H. Hibbitts, Chesterfield County, and James E. Sansing, Jr., Hopewell, Va., assignors to Allied Chemical Corporation, New York, N.Y., a corporation of New York
No Drawing. Filed Aug. 27, 1962, Ser. No. 219,714
6 Claims. (Cl. 71—29)

This application is a continuation-in-part of our copending United States application Serial No. 739,967 filed June 5, 1958 for "Fertilizers from Ammonia and Phosphorus Pentoxide," now abandoned.

This invention relates to fertilizing compositions, more specifically this invention relates to water soluble fertilizer components and a process for making the same.

To alleviate the cost attendant in the shipment and application of the fertilizer, it has been proposed to employ water soluble fertilizer which can be readily shipped in tank cars at low cost and be easily applied to the land. Ammonium dihydrogen and ammonium monohydrogen phosphates are representative, having about 12–21% nitrogen content and correspondingly about 27–23.5% phosphorous content by weight. Their solubility at low temperatures is only moderate, being only about 23 g. and 43 g. per 100 cc. of water, respectively, at 0° C., i.e., about 18.5% and 30% by weight of the solutions.

The fertilizing value of a nitrogen-phosphorus fertilizer solution is proportional to the amount of nitrogen and phosphorus contained therein; accordingly, the most desired yet heretofore unobtainable nitrogen-phosphorus fertilizer for use in solution is one having a high nitrogen content with a correspondingly high phosphorus content and high water solubility.

In accordance with this invention we provide a nitrogen-phosphorus fertilizer material for use in an aqueous solution, having higher nitrogen content and higher nitrogen:phosphorus weight ratio combined with higher water solubility than any other single source of nitrogen and phosphorus of which we are aware. Specifically our product contains about 25–30% by weight nitrogen, has a nitrogen:phosphorus weight ratio of about 0.85:1 to 1:1, and is soluble in water at temperatures as low as about −15° C. to form solutions of at least 49% by weight concentration. Moreover the water solutions of our products are highly compatible with other water-soluble nitrogen sources, such as ammonium nitrate and urea; and even tolerate large amounts of, e.g., potassium chloride, e.g., in a 10–10–10 liquid fertilizer from our product mixed with urea and potassium chloride in aqueous solution.

Our product is useful, in view of its high content of nitrogen and phosphorus and high water solubility, for flame-proofing of water-wettable materials normally used out of contact with water, such as paper and cloth, as well as in production of fertilizer solutions.

Our product is made in two stages, the first involving production of a completely water-soluble intermediate condensation product of ammonia and phosphorus pentoxide containing about 15%–22% nitrogen and believed to resemble a prior art product (Woodstock U.S. Patent 2,122,222 of June 28, 1938, Formula I and/or III) in composition and general mode of preparation; but having a critical physical form not heretofore disclosed, namely a highly expanded form having 3- to 10-fold the volume originally occupied by the phosphorus pentoxide ingredient; which highly expanded form is obtained only under the critical conditions below set forth in our first stage.

This highly expanded intermediate, we have found, is capable after reaching 15%–22% nitrogen content, of absorbing and reacting with large further proportions of ammonia, again under definite conditions, to give our new products of the high nitrogen content, high nitrogen:phosphorus weight ratio, and high water solubility above described.

Of the nitrogen content of 25%–30% in our final products, only about 50%–70% is ammoniacal nitrogen, i.e. nitrogen in a form distillable as ammonia from dilute sodium hydroxide solution. The balance can be converted to ammonium salt by acid hydrolysis; and is chemically combined probably as amido and/or imido nitrogen with phosphorus pentoxide. Acid hydrolysis also converts the phosphorus content to orthophosphate. Our final product forms weakly basic solutions in water, having pH of about 8–9, higher the higher the nitrogen content.

Our final product, in particulate form, is very hydroscopic in line with its high water solubility but nevertheless is free-flowing.

In the first stage of our process going to a nitrogen content of about 15% by weight in the product, phosphorus pentoxide is suspended in a vigorously agitated liquid hydrocarbon. The reaction mixture, in an open or closed vessel, is maintained at a temperature between about 85° C. and about 150° C. preferably between about 90° C. and about 100° C. Gaseous ammonia is added at a slow rate which allows most of the ammonia to be absorbed, so that the ammonia pressure over the reaction mixture does not rise above about one atmosphere absolute. The rate of ammonia addition must not exceed about 5 parts by weight of ammonia per 1000 parts by weight of phosphorus pentoxide present, per minute. Best results are obtained at feed rates of about 0.55 to about 2.9 parts $NH_3$ per 1000 parts by weight $P_2O_5$ per minute. At the specified temperatures, pressures and ammonia feed rates, as the first relatively small amount of ammonia is being absorbed, up to about 2 to 5 parts ammonia per 100 parts by weight $P_2O_5$, the reaction product of the ammonia with the $P_2O_5$ rapidly expands and occupies a volume 3 to 10 times larger than the original volume occupied by the $P_2O_5$ charged into the system; and at least 5 times larger under preferred conditions.

The specified slow rate of addition of the ammonia in this first stage continuing to nitrogen content of at least 15% by weight in the product, has been found to be critical in that more rapid addition i.e. substantially above 5 parts by weight of ammonia per 1000 parts by weight of $P_2O_5$ per minute causes the $NH_3$-$P_2O_5$ reaction product to agglomerate into hard lumps which are incapable of reacting with further ammonia at least in the second stage of our process.

The limitation of ammonia pressure to not substantailly above one atmosphere absolute over the reaction mixture during this first stage has also been found to be critical. Use of ammonia pressures substantially above one atmosphere, before the nitrogen content of the product reaches at least about 15% by weight, causes the ammonia to react on the surface of the $P_2O_5$ particles forming agglomerates and/or shells on the particles and preventing reaction of the $NH_3$ with the $P_2O_5$, at least in the second stage of our process.

Excessively low overall rates for the first st age require inconveniently long reaction time; accordingly, a practical lower limit for overall rate is about 0.5 part of ammonia per 1000 parts by weight $P_2O_5$ per minute.

This first step of our reaction is continued until at least about 22 parts by weight of ammonia per 100 parts by weight $P_2O_5$ have been absorbed, corresponding to about 15% by weight nitrogen absorbed.

The second stage of our process can be started with the intermeidate product obtained by the first stage as recited above, in expanded form and containing 15% nitrogen by weight. Or the first stage product can be brought, using temperature between about 50° C. and about 150° C. and ammonia feed rates which are now not critical, to as high as about 22% nitrogen content at which point second stage conditions should be used.

The temperature in our second stage is maintained in about the 50° to 150° C. range and agitation of the suspension in liquid hydrocarbons is maintained. The ammonia pressure over the reaction mixture, which is maintained in a pressure vessel in this stage, is brought to at least about 15 p.s.i.g. (about 2 atmospheres absolute), preferably about 50 p.s.i.g. (about 5 atmospheres absolute). Under these conditions the expanded intermediate product absorbs and reacts with further ammonia to form our product in about one-quarter hour to 3 hours. A pressure of about 200 p.s.i.g. (about 15 atmospheres absolute) is considered to be, for practical and economical reasons, the upper pressure limit under which the ammonia will ordinarily be added. This second stage is continued until the mixture has absorbed about 45 parts by weight of ammonia per 100 parts by weight $P_2O_5$, corresponding to about 25% by weight nitrogen in the nitrogen-phosphorus reaction product. While the ammonia pressure over the reaction mixture in the second stage of our process is critical, only at the lower pressure limit of 2 atmospheres absolute, the temperature range is, surprisingly, critical at both lower and upper limits. Too low temperatures are ineffective, and temperatures above 150° C. in the second stage tend to promote a polymerization of the nitrogen-phosphorus reaction product with attendant drop in nitrogen content, regardless of the level of ammonia pressure over the reaction mixture. The result of such polymerization is a product with low, incomplete water solubility and a lowered nitrogen content unsuited for the uses of our product above cited.

At the end of our second stage the excess ammonia is bled and can be returned to storage; most of the liquid hydrocarbon can be separated by decantation and returned to storage. If an aqueous solution of our $NH_3$—$P_2O_5$ reaction product is desired, our product containing residual hydrocarbon can be mixed with water to dissolve the reaction product and separate the liquid hydrocarbon as a layer which is removed and recovered.

Other nitrogen containing compounds such as urea and ammonium nitrate can be present in concentrated solutions of our product, without causing precipitation even at subzero temperature, as will be apparent from the illustrative examples thereof below.

If our reaction product is desired in dry state, the liquid hydrocarbon can be separated from the reaction product, e.g., by filtering or centrifuging. If a high-boiling hydrocarbon has been used, the residual hydrocarbon can be washed from the filtered material with a low-boiling hydrocarbon which in turn can be evaporated from the product.

The dried products from our process are white, free-flowing, solid articles which in line with their great water solubility are very hygroscopic. Since it is difficult to remove the last traces of the liquid hydrocarbon, the analyses for ammonia plus $P_2O_5$ usually do not add quite to 100%.

Considerable variations in formulations of solutions from these $NH_3$—$P_2O_5$ reaction products are possible. A few examples of such formulations are tabulated below.

| Components in Addition to $NH_3$—$P_2O_5$ Product | Analysis, Wt. Percent | | | Dissolution Temp., ° C. |
|---|---|---|---|---|
| | N | $P_2O_5$ | $K_2O$ | |
| $H_2O$ | 14.8 | 37 | 0 | −16.5 |
| $H_2O$+Urea+$NH_4NO_3$ | 19.5 | 28 | 0 | −32.8 |
| $H_2O$+Urea | 17.4 | 33.2 | 0 | −26.0 |
| $H_2O$+$NH_4NO_3$ | 18.8 | 30 | 0 | −17.2 |
| $H_2O$+Urea+KCl | 10 | 10 | 10 | ca. 2.5 |

Data in the above table indicate that solutions with the lowest dissolution temperatures are obtained by including urea and ammonium nitrate in solutions of our reaction product. We have observed that appreciable quantities of free ammonia in aqueous solutions of our product reduce its low temperature solubility. The solubility of our $NH_3$—$P_2O_5$ reaction products in water is at least about 49% by weight at −15° C.

The reaction between the $NH_3$ and the $P_2O_5$ is to be carried out with the $P_2O_5$ suspended in a liquid hydrocarbon. Normal heptane and naphtha have been found to be suitable for this purpose, also other petroleum fractions, such as mineral oil, kerosene, benzene, toluene and the xylenes.

The process of our invention can be carried out in apparatus adapted for pressure and not excessively attacked by the reactants or product. Ordinary iron and steel are among suitable materials of construction.

Typical solutions of our product alone in water contain about 14–17% nitrogen and about 35–42% $P_2O_5$ and have a salting out or dissolution temperature of about −15° C. Supplemental nitrogen can be added to solutions of our product by means of such nitrogen carriers as ammonium nitrate and urea. Potassium salts such as potassium chloride can be added if desired, to provide up to about 10% by weight potassium. The addition of soluble fertilizer salts and urea does not affect the stability of the solutions; addition of ammonia, on the other hand, reduces the solubility of our products. Typical formulations of our products into liquid fertilizers, using ammonium nitrate and permissibly also urea, consist of by weight about 40–50 parts of our product, about 10–20 parts of ammonium nitrate, about 35–40 parts of water, and any balance to make 100 parts being urea.

The best mode contemplated by us for carrying out our invention can be set forth as follows:

4000 lbs. of ligroin and 1500 lbs. of $P_2O_5$ are charged into a stirrer type autoclave (200 cubic feet capacity) and the $P_2O_5$ is suspended by vigorous agitation. The autoclave charge is brought to a temperature in the range of about 95° C. When the autoclave is up to temperature, gaseous anhydrous ammonia is passed into the $P_2O_5$ suspension at a rate of about 3.5 lbs. per minute, i.e., about 2.3 parts per 1000 parts by weight $P_2O_5$ per minute, so that the pressure does not exceed one atmosphere during the first two hours.

At the end of the initial 2-hour reaction period the rate of adding ammonia is increased to maintain about 100 p.s.i.g. pressure for an additional 30-minute period. A total of about 550 lbs. of ammonia are charged during the reaction. After the reaction is complete, the excess ammonia is pumped back to storage. Agitation is stopped and the product settles. Most of the liquid hydrocarbon is siphoned off. This portion of the liquid hydrocarbon can be recycled directly and returned to storage.

The reaction product analyzes about 25% nitrogen. The solid product is dissolved in water and the remaining hydrocarbon floating on the solution is removed, dried and returned to storage.

The examples which follow describe completely specific embodiments illustrative of our invention but our invention is not to be understood as limited to all details of the examples.

EXAMPLE 1

A charge of 175.8 grams of $P_2O_5$ in a finely divided state was stirred with 1500 ml. of n-heptane maintained at about 90° C. in a glass reactor. Ammonia was added to the reactor near the bottom at the rate of 0.47 gram per minute, i.e., 2.67 parts per 1000 parts by weight $P_2O_5$ per minute, for 2.5 hours. The pressure in the flask was atmospheric and some ammonia escaped from the reaction mixture.

After 2.5 hours of reaction, the mixture was transferred to a stirrer-type autoclave at about 85° C. A sample of this intermediate product taken at this time had at least 5-fold the original volume of the $P_2O_5$ used and analyzed 19% nitrogen. Ammonia was added to the autoclave to maintain a pressure of about 100 p.s.i.g. for 3 hours under continued agitation. The reaction product was then separated from the n-heptane by filtration and dried.

The final product analyzed 27.1% nitrogen and 66.5% $P_2O_5$. In this run within the first 20 minutes of ammonia addition the solids expanded and occupied essentially all of the 1500 ml. volume originally occupied by the n-heptane. Toward the end of the initial addition at one atmosphere the solids had a tendency to settle in the liquid hydrocarbon.

EXAMPLE 2

A charge of 452.9 grams of $P_2O_5$ in 4500 ml. of n-heptane was heated to 95–98° C. in a glass reactor. Ammonia was metered into the well stirred suspension at 0.5 gram per minute, i.e., 1.1 part per 1000 parts by weight $P_2O_5$ per minute, for 6 hours. The resulting expanded solids had at least 5-fold the original volume of the $P_2O_5$ used and analyzed 18.5% nitrogen.

The reaction mixture was transferred to a stirrer type autoclave and maintained at about 75° C. Ammonia was added at a rate sufficient to maintain the pressure at 100 p.s.i.g. for 30 minutes. The reaction product was then separated from the n-heptane by filtration and dried at about 75° C. The dried product analyzed 25.7% nitrogen and 66% $P_2O_5$.

The following control runs illustrate the importance of obtaining an intermediate reaction product having a nitrogen content between about 15 and 22%; and the importance of utilizing temperatures of at least about 85° C. in the first stage of our process:

Control A

Phosphorus pentoxide (283.5 g.) was added to 2300 ml. n-heptane in a stirrer type autoclave and heated to 95–97° C. The $P_2O_5$ was suspended in the heptane by vigorous stirring and ammonia was passed into the mixture at the rate of 0.325 g. per minute, i.e., 1.5 parts per 1000 parts by weight $P_2O_5$ per minute. After 6 hours the nitrogen content was 10.1% by weight.

The vent valve of the autoclave was closed, the temperature was allowed to drop to about 80° C. and the ammonia pressure was increased in increments over a 2-hour period to 100 p.s.i.g. 20 minutes after the ammonia pressure reached 100 p.s.i.g. the charge became so severely lumped that the stirrer stopped. It was difficult to remove the product from the autoclave.

Control B

Phosphorus pentoxide (186.2 g.) was suspended in 1000 ml. of n-heptane with vigorous stirring and heated to 75° C. Ammonia was passed into the mixture at the rate of 0.325 g. per minute, i.e., about 1.75 parts per 1000 parts by weight of $P_2O_5$ per minute. After 45 minutes the solids were so severely agglomerated that the stirrer stopped. The agglomerates were broken up and the run was continued for 69 minutes when agglomeration became so bad that the run had to be discontinued.

EXAMPLE 3

A solution was made containing 55 parts of our final reaction product described in Example 2 and 45 parts water. This solution analyzed 14.8% nitrogen and 37% $P_2O_5$. The dissolution temperature was −16.5° C.

EXAMPLE 4

A solution was made containing 44 parts of our final reaction product from Example 2, 20 parts ammonium nitrate and 36 parts water. The analysis of this solution was 18.8% nitrogen and 30% $P_2O_5$. The dissolution temperature was −17.2° C.

EXAMPLE 5

A solution was made containing 46.75 parts of our final reaction product from Example 2, 15 parts ammonium nitrate and 38.25 parts water. The analysis of this solution was 17.8% nitrogen and 32% $P_2O_5$. The dissolution temperature was −25.8° C.

EXAMPLE 6

A solution was made containing 43.1 parts of our final reaction product from Example 2, 13.8 parts ammonium nitrate, 7.9 parts urea, and 35.2 parts water. The analysis of this solution was 19.5% nitrogen and 28% $P_2O_5$. The dissolution temperature was −32.8° C.

It is therefore seen that the process of the instant invention not only provides for a highly ammoniated $P_2O_5$ of water solubility far in excess of that heretofore known but the instant process also provides for a very hygroscopic fertilizer component which is readily soluble in water. The process of the instant invention can be performed with a minimum of equipment and the like.

Although certain preferred embodiments of the invention have been disclosed, they have only been disclosed for the purpose of illustration and not for limitation since it will be evident that various changes and modifications may be made therein without departing from the scope and spirit of the invention.

We claim:
1. A process for reacting ammonia with phosphorus pentoxide to obtain a product having a nitrogen content between about 25 and 30% by weight and a nitrogen to phosphorus weight ratio between 0.85:1 and 1:1 and, the final product being soluble in water at temperatures as low as about −15° C. to form solutions of at least 49% by weight concentration, which process comprises:
   in a first stage, forming a completely water soluble intermediate ammonia-phosphorus pentoxide reaction product having a nitrogen content of about 15% by weight, in an expanded form occupying about 3 to 10 fold the volume originally occupied by the phosphorus pentoxide, said intermediate exepanded product being obtained by:
   (1) adding gaseous ammonia to phosphorus pentoxide suspended in a vigorously agitated liquid hydrocarbon, the ammonia being maintained at pressures not above about 1 atmosphere over the reaction mixture and the reaction temperature being maintained in the range between about 85° C. and about 150° C.;
   (2) feeding the ammonia into the reaction mixture at rates not exceeding about 5 parts by weight of ammonia per 1000 parts by weight of phosphorus pentoxide present, per minute; and
   (3) maintaining said conditions of agitation, pressure, temperature and ammonia feed rates until at least about 22 parts by weight of ammonia have been absorbed in the reaction mixture per 100 parts by weight of phosphorus pentoxide present;
   thereafter maintaining temperatures in the range of about 50° C. −150° C.; and
   in a second stage, at latest when about 37 parts by weight of ammonia have been absorbed per 100 parts by weight of phosphorus pentoxide present:
   (1) bringing the ammonia pressure over the reaction mixture to at least about 2 atmospheres absolute;
   (2) continuing agitation of the suspension in the liquid hydrocarbon;
   (3) feeding ammonia to the reaction mixture under these second stage conditions of pressure and temperature until the total ammonia in the reaction mixture is at least about 45 parts by weight per 100 parts by weight of phosphorus pentoxide present; and separating the resulting product from the liquid hydrocarbon.

2. A process of claim 1 wherein the reaction temperatures maintained in the first stage are in the range between about 90° C. and about 100° C.; wherein the rates of feeding ammonia in the first stage are in the range between about 0.55 part and about 2.9 parts per 1000 parts by weight of phosphorus pentoxide present, per minute; and wherein the pressures of ammonia maintained in the second stage are in the range between about 50 p.s.i.g. and about 200 p.s.i.g.

3. A solid, white, hygroscopic, free flowing product in particulate form said product containing compounds of hydrogen, nitrogen, phosphorus and oxygen and being further characterized by:
  (1) a total nitrogen content of 25–30% by weight of the final product, of which about 50–70% is ammoniacal;
  (2) a weight ratio of nitrogen:phosphorus in the range of about 0.85:1 to about 1:1; and
  (3) the ingredients of said hydrogen, nitrogen, phosphorus, and oxygen compounds being so chosen that an aqueous solution of said compounds is weakly basic at −15° C.

4. A solid, white, hygroscopic, free flowing product in particulate form said product containing compounds of hydrogen, nitrogen, phosphorus and oxygen and being further characterized by:
  (1) a total nitrogen content of 25–30% by weight of the final product, of which about 50–70% is ammoniacal;
  (2) a weight ratio of nitrogen:phosphorus in the range of about 0.85:1 to about 1:1; and
  (3) the ingredients of said hydrogen, nitrogen, phosphorus, and oxygen compounds being so chosen that an aqueous solution of said compounds is weakly basic at −15° C.; and being further characterized by forming a basic solution when dissolved in water said solution having a pH of about 8–9.

5. A liquid fertilizer consisting essentially of, in parts by weight, the product of claim 3—about 40–50 parts; ammonium nitrate—about 10–20 parts; water—about 35 to 40 parts; the sum of said product, ammonium nitrate and water being 100 parts.

6. A liquid fertilizer consisting essentially of, in parts by weight, the product of claim 3—about 40–50 parts; ammonium nitrate—about 10–20 parts; water—about 35 to 40 parts; and the balance to make 100 parts being urea.

References Cited by the Examiner
UNITED STATES PATENTS

| | | | |
|---|---|---|---|
| 2,122,122 | 6/1938 | Woodstock | 23—106 |
| 2,770,540 | 11/1956 | Vierling | 71—1 |
| 2,799,569 | 7/1957 | Wordie et al. | 71—41 |
| 2,814,556 | 11/1957 | Christoffel | 71—29 |
| 2,974,010 | 3/1961 | Koster | 71—43 |
| 3,011,875 | 12/1961 | Sumner | 71—41 |

DONALL H. SYLVESTER, *Primary Examiner.*

ANTHONY SCIAMANNA, *Examiner.*